March 19, 1963 R. O. WILEY 3,082,303
WIRING DEVICE FOR CONTROL OF CIRCUIT CONTINUITY
Filed Nov. 19, 1959 2 Sheets-Sheet 1

March 19, 1963  R. O. WILEY  3,082,303
WIRING DEVICE FOR CONTROL OF CIRCUIT CONTINUITY
Filed Nov. 19, 1959  2 Sheets-Sheet 2

WITNESSES:
Bernard R. Gieguez
Edward F. Possessky

INVENTOR
Roy O. Wiley
BY
Donald Smith
ATTORNEY

United States Patent Office 3,082,303
Patented Mar. 19, 1963

3,082,303
WIRING DEVICE FOR CONTROL OF CIRCUIT
CONTINUITY
Roy O. Wiley, Newtown, Conn., assignor to Westinghouse Electric Corporation, East Pittsburgh, Pa., a corporation of Pennsylvania
Filed Nov. 19, 1959, Ser. No. 854,135
8 Claims. (Cl. 200—67)

The present invention relates to electrical wiring devices, and more particularly to wiring devices that are constructed for controlling the continuity of electrical circuits.

Wiring devices for control of circuit continuity are customarily referred to as switches, breakers, or interrupters, or through the use of other and similar descriptive terms. However, the semantics of these terms is such as occasionally to limit the meaning of each to be descriptive of only a certain species of the class of wiring devices being considered here. The general terminology being employed is, therefore, intended to be inclusive of the customary terms just indicated even though these customary terms are often accorded the intended broad meaning of the present terminology.

The control of the continuity of a circuit can be accomplished with any of a variety of physical arrangements which, in turn, can be provided with a variety of selected operational features. For example, a wiring device for controlling circuit continuity is conventionally provided with contact portions which, when engaged with each other, provide continuity for an associated circuit, and, when disengaged from each other, interrupt the continuity of the associated circuit. To control the operation of the contact portions, and therefore the circuit continuity, means are provided for forcing the contact portions to and from their engaged position.

As indicated in a copending application of R. O. Wiley, entitled Wiring Device, filed March 24, 1959, Serial No. 801,658, now Patent No. 3,036,171, and another copending application of R. O. Wiley and C. D. Baxendel, entitled Wiring Device, filed March 24, 1959, Serial No. 801,660, now Patent No. 3,036,185, both assigned to the present assignee, it is desirable to provide a facilitated operation for wiring devices that control circuit continuity in a manner such that nominal actuating forces, exercised through a very limited distance, are amplified to provide greater forces for directly controlling the engagement of the contact portions. The benefits to be realized from such an arrangement, as distinguished from more conventional arrangements in which greater operating forces exercised through greater distances are required, indeed have significant import. For example, in the field of interior wiring for residential and commercial housing units, a wiring device, constructed as just described, can be employed as a switch having a substantially planar actuator to provide substantial continuity for the face of the switch with the surface of the wall in which the switch is mounted thereby affording a pleasing appearance consistent with interior decorating considerations. Additionally, because only nominal forces are required for operation of the switch, actuation is considerably facilitated for purposes of convenience. In other applications in which only nominal actuating forces are available, considerably sensitive control of circuit continuity inheres in a wiring device of the construction just described.

In addition, there are instances in which it is desirable to control the continuity of a circuit only for so long as an actuating force is applied to the controlling wiring device, as in instances in which a relay is to be actuated by being momentarily energized. Thus, with the use of a wiring device constructed to provide this feature, the continuity of a circuit, for example one controlling suitable instrumentation or a servo-mechanism for performing momentary operations or functions, can be controlled for a duration of time equal to the length of time that the actuating force is applied to the wiring device. In creating a wiring device to provide the latter feature along with the previously described feature that affords a facility of operation, it is paramount that the wiring device be accorded both a durable and an economic character.

Thus, it is an object of the invention to provide a novel and efficient wiring device that affords control of the continuity of a circuit for so long as an actuating force is applied to the wiring device.

Another object of the invention is to provide a wiring device of the character described that can be actuated by a nominal force exercised through a nominal distance to control the continuity of a circuit for so long as the force is applied.

It is a further object of the invention to provide novel switch means in which contact carrying members can be actuated by a nominal force exercised over a nominal distance to control the continuity of a circuit for so long as the actuating force is applied.

It is yet another object of the invention to provide switch means, of the character described, having a single actuator which can be moved nominally to make or break selectively a circuit, or a plurality of circuits, through the exercise of nominal actuating forces at different points of the actuator.

It is still another object of the invention to provide switch means, of the character described, including a moment member that exercises a moment of force upon the contact carrying members to ensure that the circuit control, effected by the actuating forces, is reversed when the actuating forces are removed.

These and other objects of the invention will become more apparent upon consideration of the following detailed description of an illustrative embodiment of the invention as related to the attached drawings, in which.

With regard to the broad aspects of the invention, only a nominal amount of energy or work is required for actuation of an arrangement of physical elements to engage or disengage contact portions, which form a part of the arrangement, for so long as the actuating force is applied. The required energy is the product of the actuating force, which is a nominal one, and a nominal distance through which the actuating force is exercised. In addition, durability is provided for the arrangement as a result of the means by which the contact portions are operated to resist fusion and wear from arcing, particularly any arcing exhibiting high electron flow between the contact portions. Because the principles of the invention are generally applicable to any arrangement of physical elements comprising a wiring device, it is intended that the illustrative embodiment to be described here be only exemplary and not limitative of the invention.

Figure 1:
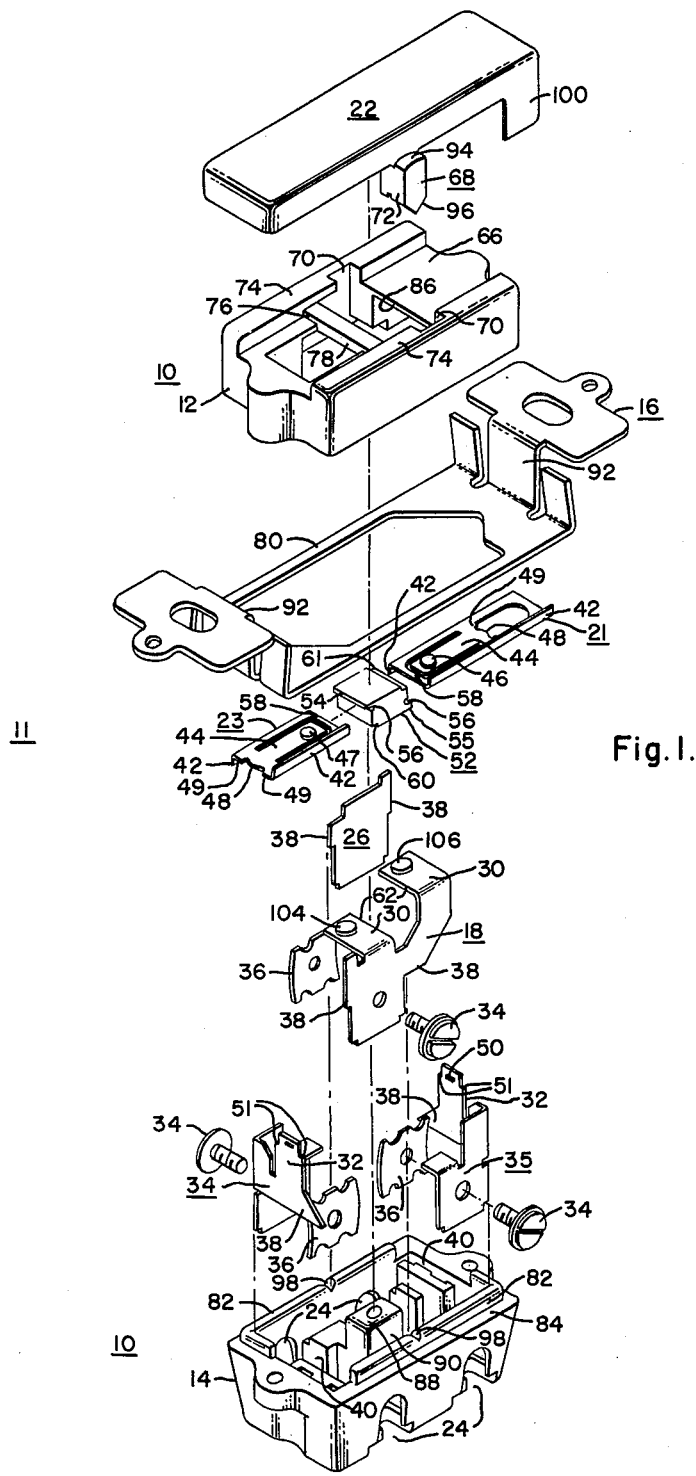
FIGURE 1 is an exploded isometric view of a wiring device constructed in accordance with the principles of the invention.

With the latter consideration in the foreground, the detailed description will now be set forth. As illustrated in FIG. 1, a housing or base 10 for supporting and enclosing other operational elements of a switch 11 is formed by an upper component 12 and a low component 14. Mounting means are provided for the switch 11 in the form of a mounting member or yoke 16 that is secured to the housing 10 in a position intermediate to the upper and lower housing components 12 and 14. In order to provide for making desired connections to electrical circuits, terminals 18, 34 and 35 are mounted in the housing 10 in normally spaced and electrically isolated positions. In addition, space for an additional terminal (not shown) is provided in the housing 10, with a blank member 26 of insulating material provided in this example in place of the suggested additional terminal. If desired, the latter terminal can be provided with a form similar to the terminal 18 in other applications of the invention.

Control of the continuity of a circuit between any pair of the terminals 18, 34 and 35, in this example between the terminal 18 and the terminals 34 and 35, is effected by an operation of movable arms 21 and 23 which are resiliently supported in the housing 10. To provide forces for causing operational movement of the movable arms 21 and 23, an actuator 22 is engaged with the housing 10 in a position suitable for this operation.

Generally considered, the upper and lower housing components 12 and 14 are exteriorly formed to provide a unitary appearance for the housing 10. Interiorly, the upper and lower housing components 12 and 14 are formed, as noted earlier and to be explained more fully hereinafter, to support other operational elements of the switch 11. Thus, provision is made in the housing 10 for support of the terminals 18, 34 and 35, the actuator 22 and the movable arms 20 in operative positions.

As observed in FIG. 1, the lower housing component 14 has four terminal access ports 24. Accordingly, each of the terminals 18, 34 and 35 is positioned in the housing component 14 to be accessible through an associated port 24. The terminal 18 is provided with a pair of contact bearing arms 30 for reasons to become apparent subsequently. An arm 32 is extended upwardly from the terminals 34 and 35 for resilient and supporting engagement with the movable arms 21 and 23, respectively.

Means for engaging external conductors are included as part of the conductive terminals 18, 34 and 35 to provide for forming connections with electrical circuits. The conductor engaging means employed here includes a nut and bolt assembly 36, for which the operation is fully disclosed in U.S. Patent 2,899,524 of C. M. Smith, entitled Wiring Device, issued August 11, 1959, and assigned to the present assignee. Since modified constructions of the conductor engaging means will readily occur to those skilled in the art of the invention, it is intended that the construction shown here be only illustrative of one arrangement for use with the invention.

When the terminals 18, 34 and 35 are inserted in the lower housing component 14, projecting portions 38 of the terminals 18, 34 and 35 are engaged in correspondingly positioned slots 40 (most clearly viewed in FIG. 1) of the lower housing component 14 to support the terminals 18, 34 and 35 against both downward and lateral forces, with noted directions being made with reference to the drawings. Assembly of the upper housing component 12 with the lower housing component 14 ensures support of the terminals 18, 34 and 35 against upward or withdrawal forces in a manner to be described subsequently. Although the portions 38 of the terminals 34 and 35 are engaged in corresponding housing slots 40, it is to be noted that the arm 32 of each of the terminals 34 and 35 is free, as observed in FIG. 2, for resilient deflection as a cantilever spring element.

The description of the structure of the terminals 18, 34 and 35 and the physical relationships of the terminals 18, 34 and 35 with respect to other elements of the switch 11 has been undertaken here only insofar as the terminals 18, 34 and 35 are related to the principles of the invention. For a more thorough description of the terminals 18, 34 and 35, reference can be made to the first of the previously mentioned copending applications of Wiley and Baxendel.

The movable arms 21 and 23, as viewed in FIG. 1, are provided with longitudinal ribs 42 for strength against longitudinal bending. Additionally, each of the movable arms 21 and 23 is provided, for reasons to be related subsequently, with a cantilever tab 44 bearing a contact 46 or 47, respectively, of a suitable material such as silver. A projecting ledge 48 is also formed adjacent to portions 49 of the movable arms 21 and 23 to provide for making an operational or latching and pivotal engagement with the terminal arms 32 under projections 50 thereof, respectively.

A moment member 52, formed either from an insulating or from a conductive material depending upon the circuitry to be controlled, is provided with projecting ledges 54 and 55 for pivotal movement relative to the housing 10 and laterally opposed, vertically offset grooves 56 for pivotal support of end portions 58 of the movable arms 21 and 23, respectively. Notches 60 and 61 are also provided in the moment member 52 for engagement with portions 62 of the terminal arms 30 to limit pivotal movement of the moment member 52 during operation of the switch 11.

Figure 2:
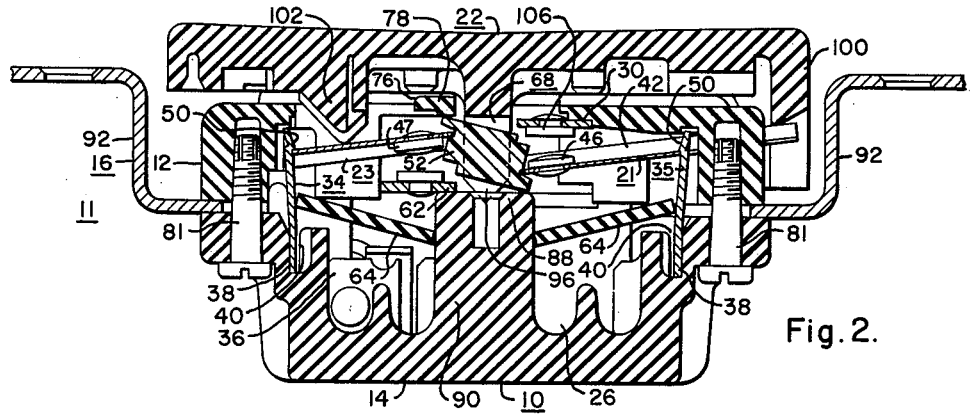
FIG. 2 is a sectional view of the wiring device shown in FIG. 1, when assembled, taken along a vertical plane through the longitudinal axis of the wiring device.

With the terminals 18, 34 and 35 assembled with the lower housing component 14 in the manner previously described, the movable arms 21 and 23 and the moment member 52, along with the housing component 12, can next be assembled with the housing component 14. As illustrated in FIG. 2, it is desirable prior to assembly of the movable arms 21 and 23 with the housing components 12 and 14 to insert insulators 64 (FIG. 2) in the space within the lower housing component 14 and above the supported terminals 18, 34 and 35 to ensure electrical isolation of the terminals 18, 34 and 35 from other conductive portions of the switch 11 to be positioned above the terminals 18, 34 and 35.

The moment member 52 is positioned relative to the housing components 12 and 14 in the manner indicated in FIG. 2 and the end portions 58 of the movable arms 21 and 23 are engaged, respectively, in the grooves 56 of the moment member 52. The movable arms 21 and 23 are then rotated downwardly, with reference to the drawings, about their engaged end portions 58 so that the projecting ledges 48 of the movable arms 20, respectively, frictionally slide along the terminal arms 32 until the ledges 48 snap under the terminal arm projections 50 and the portions 49 abut shoulders 51 of the terminal arms 32, respectively. As a consequence of the assembly just indicated, the terminal arms 32 are deflected outwardly to bear against the movable arms 21 and 23 with a substantial component of force directed inwardly along the longitudinal dimension of the movable arms 21 and 23. Of course, the moment member 52 reacts with forces opposite to those of the terminal arms 32 to hold the movable arms 21 and 23 in their respective positions between the terminal arms 32 and the moment member 52.

As a further step in the assembly of the switch 11, the actuator 22 is engaged in a channel 66 of the upper housing component 12 so that pivotal projections 68 of the actuator 22 are extended through slots 70 of the upper housing component 12. Longitudinal movement of the actuator 22 to the left with respect to the upper housing component 12, as viewed in FIG. 1, then results in pivotal engagement of laterally extended portions 72 of the actuator pivotal projections 68 with overhang portions 74 that are adjacent to the slots 70 of the upper housing component 12. The actuator 22 can then be pivoted to a limited extent about a raised portion of a cross-rib 78 in the channel 66 of the upper housing component 12 without lateral displacement.

To support the movable arms 21 and 23 in their previously described assembled position, it is necessary to force the moment member 52 downwardly until the upper housing component 12 is assembled with the lower housing component 14. After positioning the yoke 16 so that a rim portion 80 thereof is indexed to surround upstanding ribs 82 of the lower housing component 14 and to abut an upper ledge 84 of the lower housing component 14, the upper housing component 12 can be positioned against the yoke 16 so that fasteners 81 (FIG. 2) passed through the lower housing component 12, are engaged with the upper housing component 14 to clamp the yoke 16 and the upper and lower housing components 12 and 14 in assembled relation. The movable arms 21 and 23 and the moment member 52 are then held in assembled relation since the cross-rib 78 of the upper housing component 12 then bears against the upper ledge 54 of the moment member 52 (FIG. 2).

The interior of the upper housing component 12, as previously noted, is formed with portions that bear upon the terminals 18, 34 and 35 against withdrawal form their inserted positions in the lower housing component 14. Additionally, the upper housing component 12 provides space for resilient deflection of the terminal arms 32 and operation of the assembly of the movable arms 21 and 23 and the moment member 52. It is to be noted that the offset arm 30 of the terminal 18 abuts an inner surface 86 of the upper housing component 12 and the other arm 30 of the terminal 18 abuts an upper surface 88 of an upwardly extended projection 90 of the lower housing component 14. The arms 30 are therefore provided with stationary positions for operation of the switch 11 in a manner to be explained hereinafter.

With the switch 11 assembled as described, the actuator 22 cannot be withdrawn from the housing 10 through the upper housing slots 70 because longitudinal movement of the actuator 22 is limited as will subsequently become evident. Further, an upper curved surface 94 of the laterally extended portion 72 of each of the actuator pivotal projections 68 and a lower knife portion 96 of the projections 68 facilitate pivotal movement of the actuator 22 with respect to the housing 10. The curved surface 94 bears against the underside of the adjacent upper housing portions 74 and the knife portion 96 bears against the lower housing component 14 in a correspondingly formed indent 98 in the adjacent upstanding rib 82. Thus, the indents 98 provide for pivotal movement of the knife portions 96 and, additionally, limit longitudinal movement of the actuator 22.

A downwardly extended projection 100 at one end of the actuator 22, with reference to FIG. 1, is positioned for engagement with the movable arm 21, and another downwardly extended projection 102, with reference to FIG. 2, is positioned for engagement with the other movable arm 23. Thus, pivotal movement of the actuator 22 about the knife portions 96 in the clockwise direction exercises bearing forces on the movable arm 21 and pivotal movement of the actuator 22 in the counterclockwise direction exercises bearing forces on the other movable arm 23.

With regard to the operation of the assembled switch 11, the movable arms 21 and 23 have an equilibrium, open circuit position as shown in FIG. 2. In this position, the upper ledge 54 of the moment member 52 adjoins the underside of the upper housing cross-rib 78 in consequence of forces transmitted longitudinally of the movable arms 21 and 23 from the deflected terminal arms 32 which support the movable arms 21 and 23. Additionally, the lower ledge 54 of the moment member 52 adjoins an upper surface 88 of the projection 90 of the lower housing component 14.

Figure 3:
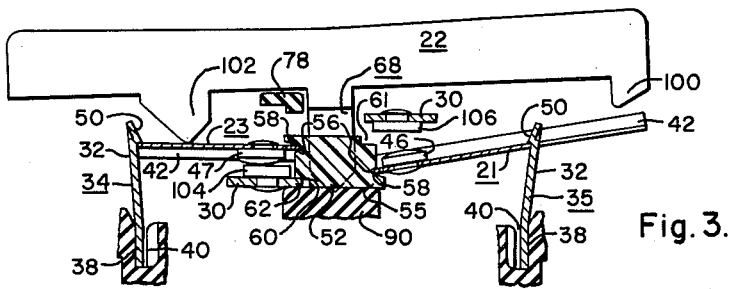
FIG. 3 is an elevational view, partially sectioned, of the wiring device shown in FIG. 2 showing contact elements in one operative or controlling position and having parts broken away and other parts removed for clarity.

As illustrated in FIG. 3, a nominal downward force causing the actuator 22 to pivot in a counterclockwise direction, causes the actuator projection 102 to pivot forcefully the movable arm 23 in a clockwise direction about the associated supporting terminal arm 32. As the movable arm 23 pivots, the moment member 52 is forced to pivot in a counterclockwise direction about its lower ledge in response to downward forces of the end portion 58 of the movable arm 23. The forced pivotal motion of the movable arm 23 is terminated after the contact 47 of its cantilever tab 44 engages a contact 104 of the underset stationary arm 30 of the terminal 18 and when the undersurface of the moment member 52 is substantially flush with the upper surface 88 of the lower housing projection 90 and the notch 60 of the moment member 52 is engaged with the portion 62 of the arm 30 of the terminal 18.

During the pivotal movement of the movable arm 23, the terminal arm 32 is deflected to the left, as viewed in FIG. 2, by forces transmitted longitudinally of the movable arm 23 from the rotating moment member 52. Thus, the contact 47 of the movable arm 23 is moved both downwardly and toward the left to provide a wiping motion during the making of the engagement of the contacts 47 and 104.

Additionally, deflection of the cantilever tab 44 of the movable arm 23 during the engagement imparts a rolling motion to the contact 47 with respect to the terminal contact 104. The mentioned wiping and rolling motions prevent the formation of any welds, between the contacts 47 and 104, that might arise in consequence of high electron flow during arcing just prior to the engagement of the contacts 47 and 104. As can readily be observed in FIGS. 2 and 3, the other movable arm 21 undergoes relatively little motion during the operation of the switch 11 in closing the contacts 47 and 104 as thus far described.

The amount of force that is imposed upon the actuator 22 to force the movable arm 23 to move pivotally is quantitatively on the order of several ounces and is therefore relatively nominal. Additionally, the distance through which the force is exercised is that which is subtended by an angle which is quantitatively on the order of 3 or 4 degrees and is therefore also relatively nominal.

So long as the force is maintained upon the actuator 22 the movable arm 23 remains in the position shown in FIG. 3. The position of the movable arm 23 relative to the moment member 52 and the other movable arm 21 shown in FIG. 3 is an unstable one once the actuator 22 is released so that the movable arm 23 and the moment member 52 spring to their original positions (shown in FIG. 2) to disengage the contacts 47 and 104 with a rolling and wiping action similar to the one previously described. The instability is a result of the fact that the terminal member arms 32, being deflected, impose forces that are transmitted longitudinally of the movable arms 21 and 23 to the moment member 52 in vertically displaced planes to create a moment of force causing the moment member 52 to rotate in a clockwise direction about the lower ledge 54 and therefore to return to its original position shown in FIG. 2. The mentioned longitudinal forces are in vertically spaced planes because, as previously noted, the end portions 58 of the movable arms 21 and 23 are engaged in the moment member grooves 56 which are vertically offset to lie adjacent the upper and lower ledges 54 and 55, respectively, of the moment member 52.

Figure 4:
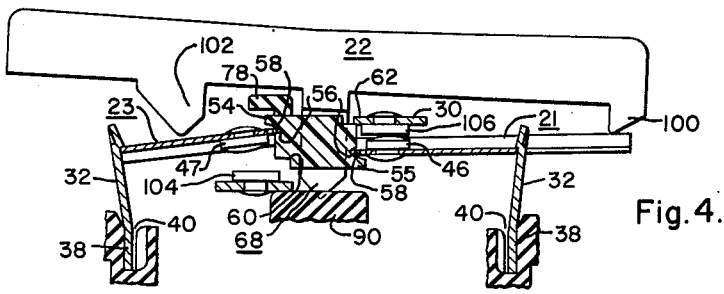
FIG. 4 is an elevational view, similar to FIG. 3, of the wiring device shown in FIG. 2 illustrating another operative or controlling position of the contact elements.

When the actuator 22 is forced to pivot in a clockwise direction, as indicated in FIG. 4, so that the actuator projection 100 engages the movable arm 21, an operation similar to the one just described occurs. Thus, the actuator projection 100 forces the movable arm 21 to pivot in a clockwise direction about the associated and supporting terminal arm 32 so that the contact 46 of its cantilever tab 44 engages a contact 106 of the stationary offset arm 30 of the terminal 18 when the upper surface of the moment member 52 is substantially flush with the upper housing cross-rib 78 and the notch 61 of the moment member 52 is engaged with the portion 62 of the offset terminal arm 30. In this operation of the switch 11, the moment member 52 is caused to pivot in a counterclockwise direction about its upper ledge 54.

So long as force is maintained on the actuator 22, in this instance, the movable arm 21 is held in the position shown in FIG. 4. However, upon release of the actuator 22, the movable arm 21 and the moment member 52 spring to their original positions shown in FIG. 2. This is because a clockwise moment is exerted on the moment member 52 from forces generated by flexure of the terminal arms 32 causing the moment member 52 to rotate in a clockwise direction about its upper ledge 54. As in connection with the operation related to FIG. 3, the closing of the contacts 46 and 106 in the operation just described requires only the exercise of a nominal force through a nominal distance.

In the operations related both to FIG. 3 and to FIG. 4, a portion of the actuating energy, to use an alternative conceptual approach, is stored in the flexed terminal arms 32 so that, upon release of the actuator 22, the stored energy is released to return the movable arms and the moment member assembly 21, 23, 52 to its original or normal position as shown in FIG. 2.

From what has thus far been set forth, it is to be observed that the terminals 18, 34 and 35 can be provided with varied structural portions having appropriately positioned contacts for a great variety of circuit control arrangements. In the illustrative embodiment of the invention, the terminal 18 is provided with a pair of contacts 104 and 106. The contact 104 can be engaged with the overset contact 47 of the movable arm 23, which is electrically connected to the terminal 34, upon operation of the switch 11 as described in connection with FIG. 3, and the contact 106 can be engaged with the contact 46 of the movable arm 21, which is electrically connected to the terminal 35, upon operation of the switch 11 as described in connection with FIG. 4. This structural arrangement of contacts and terminals is in a form known as a single-pole, double-throw arrangement, because the terminal 18 forms one pole to be electrically connectable to either of two terminals 34 or 35 or poles in completing an electrical path by a throw of the actuator 22 in either of two directions.

It is to be anticipated that modifications of the form and arrangement of any or all of the operative elements of the switch described here will be obvious to those skilled in the art of the invention in employing the invention for varied control functions. For instance, as just exemplarily related, contacts for any of the terminals can be arranged either above or below the contacts 46 and 47 of the movable arms 21 and 23 in any combination to provide continuity control of the circuits concomitant to the selected arrangement.

The embodiment of the invention described here, as previously noted, is intended only to be illustrative and not limitative of the principles of the invention. Accordingly, it is desired that the invention be accorded an interpretation consistent with the scope and spirit of its broad principles.

What is claimed is:

1. A wiring device comprising an insulating housing member, a pair of elongated conductive members positioned end-to-end in said housing, a plurality of spaced terminal members mounted in said housing, each of a pair of said terminal members having a resilient portion engaging an outer portion of said elongated members, respectively, at least one of said terminal members having a contact for engagement with a contact of at least one of said elongated members, rotatable means positioned for pivotal movement within said housing and engaging an inner portion of each of said elongated members in respective offset lateral planes, said terminal resilient portions imposing forces at least longitudinally of said elongated members to urge said rotatable means toward one rotary position in which one circuit condition of said contacts is defined, a relatively planar elongated actuating member engaging said housing for pivotal movement relative thereto and having first and second portions for actuating the outer portions of said elongated members, respectively, so that said rotatable means can be pivoted into second and third rotary positions, respectively, and thereby define the opposite circuit condition of said contacts in one of said second and third positions, the longitudinal forces of said terminal resilient portions creating a moment of force applied to said rotatable means and causing said rotatable means to rotate to said one rotary position when said actuating means are released, means for connecting a conductor to said terminal members, respectively, and means for mounting said wiring device, whereby the electrical continuity between said contacts can be momentarily controlled.

2. A wiring device comprising an insulative housing, a pair of elongated conductive members being positioned in said housing in end-to-end relation, at least one of said elongated members having a contact located thereon in proximity to a stationary mating contact in said housing, movable insulative means suitably positioned in said housing to support the inner end portion of each of said elongated members, resilient means for supporting an outer portion of each of said elongated members, an elongated actuator pivotally supported relative to said housing and having a portion engaging another portion of said one elongated member, said other portion being spaced longitudinally from said outer and said inner end portions of said one elongated member, each of said resilient means urging said movable means toward such a position as to urge said one elongated member pivotally about its outer portion in one position against said actuator portion and thereby relate said contacts in one circuit condition, said one elongated member pivoting to a second position in response to pivotal movement of said actuator so as to relate said contacts in the opposite circuit condition, and each of said resilient means urging said one elongated member into said one position when said actuator is released.

3. A wiring device comprising an insulative housing, a pair of elongated conductive members positioned in end-to-end relation in said housing, at least one of said elongated members having a contact located thereon in proximity to a stationary mating contact in said housing, means for resiliently supporting an outer portion of each of said elongated members, means for supporting insulative pivot means for pivotal movement in said housing, said pivot means engaging an inner portion of each of said elongated members in respective offset lateral planes, the first-mentioned supporting means imposing forces at least longitudinally of said elongated members to urge said pivot means toward one pivotal position so as to define one circuit condition of said contacts, an elongated actuator pivotally supported relative to said housing and having a portion engaging another portion of said one elongated member, said other portion being spaced longitudinally from said outer and said inner end portions of said one elongated member, said pivot means pivoting to another pivotal position in response to pivotal movement of said one elongated member about its outer portion as produced by pivotal movement of said actuator so as to define the opposite circuit condition of said contacts, the longitudinal forces of the first-mentioned supporting means creating a moment of force applied to said pivot means and urging said pivot means to pivot from said other pivotal position to said one pivotal position when said actuating means are released.

4. A wiring device comprising an insulative housing, at least one elongated conductive member having a contact located thereon in proximity to a stationary mating contact in said housing, support means having a pivot portion engaging one support portion of said elongated member, a terminal having a resilient support arm engaging another elongated member support portion spaced longitudinally from said one support portion, an elongated actuator pivotally supported relative to said housing and having a portion engaging an elongated member portion longitudinally spaced from each of said elongated member support portions, said support means and said terminal support arm resiliently urging said elongated member pivotally about said other support portion in one position against said actuator portion thereby to relate said contacts in one circuit condition, said elongated member pivoting to a second position in response to pivotal movement of said actuator so as to relate said contacts in the opposite circuit condition, and said support means and said terminal support arm urging said elongated member into said one position when said actuator is released.

5. A wiring device comprising an insulative housing, a pair of elongated conductive members being positioned in said housing in end-to-end relation, at least one of said elongated members having a contact located thereon in proximity to a stationary mating contact in said housing, movable insulative means suitably positioned in said housing to support the inner end portion of each of said elongated members, respective terminals having respective resilient arms for supporting an outer portion of each of said elongated members, an elongated actuator pivotally supported relative to said housing and having a portion engaging another portion of said one elongated member, said other portion being spaced longitudinally from said outer and said inner end portions of said one elongated member, said terminal arms urging said movable means toward such a position as to urge said one elongated member pivotally about its outer portion in one position against said actuator portion and thereby relate said contacts in one circuit condition, said one elongated member pivoting to a second position in response to pivotal movement of said actuator so as to relate said contacts in the opposite circuit condition, and said terminal arms urging said one elongated member into said one position when said actuator is released.

6. A wiring device comprising an insulative housing, a pair of elongated conductive members positioned in end-to-end relation in said housing, at least one of said elongated members having a contact located thereon in proximity to a stationary mating contact in said housing, means for resiliently supporting an outer portion of each of said elongated members, means for supporting insulative pivot means for pivotal movement in said housing, said pivot means engaging an inner portion of each of said elongated members in respective offset lateral planes, the first-mentioned supporting means imposing forces at least longitudinally of said elongated members to urge said pivot means toward one pivotal position so as to define one circuit condition of said contacts, and means for actuating said pivot means into at least another pivotal position to pivot cooperatively at least one of said elongated members about its outer portion and thereby define the opposite circuit condition of said contacts, the longitudinal forces of the first-mentioned supporting means creating a moment of force applied to said pivot means and urging said pivot means to pivot from said other pivotal position to said one pivotal position when said actuating means are released.

7. A wiring device comprising an insulative housing, a pair of elongated conductive members positioned in end-to-end relation in said housing, each of said elongated members having a contact located thereon in proximity to a stationary mating contact in said housing, insulative pivot means suitably positioned in said housing to support the inner end portion of each of said elongated members in respective offset lateral planes, resilient means for supporting an outer portion of each of said elongated members, an elongated actuator pivotally supported relative to said housing and having first and second portions engaging respective other portions of said elongated members, one of said other portions being located intermediately of said inner end and said outer portions of the associated elongated member, the remaining other portion being located outwardly of said outer portion of the associated elongated member, said resilient means urging said elongated members longitudinally inwardly so as to apply a moment of force to said pivot means and thereby position the latter in a first pivotal position in which first and second pivot portions thereof are supported by respective means in said housing and in which a first circuit condition is defined respectively for the mating pairs of said contacts, one of said elongated members pivoting about its outer portion in response to pivotal movement of said actuator in one direction from its normal position so as to urge said pivot means to pivot about its first portion into a second pivotal position and so as to define the opposite circuit condition for the one elongated member contact and its mating stationary contact, the other elongated member pivoting about its outer portion in response to pivotal movement of said actuator in the opposite direction from its normal position so as to urge said pivot means to pivot about its second portion into a third pivotal position and so as to define the opposite circuit condition for the other elongated member contact and its mating stationary contact, said pivot means being urged from its second and third positions to its first position by said resilient means so as to urge said actuator to its normal position when said actuator is released.

8. A wiring device comprising an insulative housing, a pair of elongated conductive members being positioned in said housing in end-to-end relation with insulative pivot means supporting an inner end portion of each of said conductive members, means for limiting the pivotal movement of said pivot means, at least one of said elongated members having a contact located thereon in proximity to a stationary mating contact in said housing, respective means for supporting an outer portion of each of said elongated members, an elongated actuator pivotally supported relative to said housing and having a portion engaging another portion of said one elongated member, said other portion being spaced longitudinally from said outer and said inner end portions of said one elongated member, at least one of said supporting means being resilient and urging said pivot means into one limit pivotal position and thereby urging said one elongated member pivotally about its outer portion in a first position against said actuator portion so as to relate said contacts in one circuit condition, said one elongated member and said pivot means cooperatively pivoting to respective second positions in response to pivotal movement of said actuator so as to relate said contacts in the opposite circuit condition, and said one resilient supporting means urging said pivot means into said one limit pivotal position and said one elongated member into said first position when said actuator is released.

References Cited in the file of this patent

UNITED STATES PATENTS

| 1,439,231 | Erickson | Dec. 19, 1922 |
| 1,790,974 | Cox | Feb. 3, 1931 |
| 2,194,533 | Van Dyke | Mar. 26, 1940 |
| 2,285,887 | Benander | June 9, 1942 |
| 2,460,087 | Hollis | Jan. 25, 1949 |
| 2,571,453 | Jackson | Oct. 16, 1951 |
| 2,645,726 | Van Ryan et al. | July 14, 1953 |

FOREIGN PATENTS

| 1,175,127 | France | Nov. 10, 1958 |
| 1,181,443 | France | Jan. 12, 1959 |